United States Patent [19]

Hayat et al.

[11] Patent Number: 5,589,999

[45] Date of Patent: Dec. 31, 1996

[54] TAPE RECORDER AND OFFSET PLAYBACK APPARATUS WITH A VARIABLE TAPE LENGTH BETWEEN THE RECORDING AND READING HEAD

[76] Inventors: Marc Hayat, 13 rue de Liège, Paris, France, 75009; Max de Ferran, 4 Grande Rue, Bazainville, France, 78550

[21] Appl. No.: 367,182
[22] PCT Filed: Jul. 1, 1993
[86] PCT No.: PCT/FR93/00666
§ 371 Date: Dec. 28, 1994
§ 102(e) Date: Dec. 28, 1994
[87] PCT Pub. No.: WO94/01863
PCT Pub. Date: Jan. 20, 1994

[30] Foreign Application Priority Data

Jul. 1, 1992 [FR] France ................................. 92 08085

[51] Int. Cl.$^6$ .................................................. G11B 5/027
[52] U.S. Cl. ............................................................ 360/85
[58] Field of Search ........................................ 360/84–85

*Primary Examiner*—A. J. Heinz
*Attorney, Agent, or Firm*—Bierman & Muserlian

[57] ABSTRACT

A recording head (9) and a playback head (8) each provided with a separate actuating device, a storage hopper (33) between the heads (8, 9) receives the tape (2) fed out by the recording head (9) and stores in loose, random folds when the tape region facing the recording head (9) is at a distance from the tape region facing the reading head (8), two reels interacting with respective heads are arranged in a cassette (1), when the cassette is inserted, a roller (3) grips the tape and pre-engages it into the storage hopper (33), which apparatus enables time-delay playback without causing undesirable congestion or tape installation problems.

11 Claims, 4 Drawing Sheets

TAPE RECORDER AND OFFSET PLAYBACK APPARATUS WITH A VARIABLE TAPE LENGTH BETWEEN THE RECORDING AND READING HEAD

This invention relates generally to an apparatus for recording on and playing back a tape which is capable of being recorded on and played back such as a video-tape recorder or tape recorder.

Commercially available apparatuses of this type include a single head carrier mechanism on which are located both the means of recording electrical signals on a magnetic tape and the means of reproduction by playing back signals of this type.

During the recording operation the tape is brought into contact with the head carrier and the signals are applied to the head.

During the reverse operation, i.e. during playback the tape is again brought into contact with the head carrier. The recorded messages are analysed by the head or the heads so as to reconstitute the video or audio signals which have been recorded previously.

The recording and playback functions are independent of each other.

In addition this type of apparatus includes two reels which are frequently grouped together in a cassette and each of which receives the tape over a certain length from one of its ends respectively. The rotational speeds of these two reels are controlled in relation to each other.

This applies both to sound recordings and to recordings of images.

The disadvantage of these apparatuses is that recordings on the tape or the playing back of the tape cannot be carried out simultaneously and independently of each other. Consequently he can reproduce it in full. In other words the user is not able to play back the beginning of this recording during the recording process.

According to the document EDN ELECTRICAL DESIGN NEWS, Vol.8, No.9, August 1963, Newton, Mass., pages 18–21 a recording and playback apparatus for information data is known which includes two sets of recording and reading heads and a reel for each set of heads. There is a storage hopper to receive a certain length of tape and to store it in loose and random folds when one of the sets of heads is used for example to playback with a constant delay what has been recorded or to record and playback at different speeds. The two reels are controlled independently of each other as well as the two sets of heads. Concerning a simultaneous effect playback structure, the playback reel can be known as the reel on which the tape is wound in during a normal playback operation and the recording reel can be known as the reel from which the tape is fed out towards the head carrying out the recording.

According to this document this apparatus is used above all to process information data recorded on tape with a certain delay between the recording and the playback.

This known apparatus is cumbersome as it is necessary for the tape to be run from the recording reel to the recording head and then to the intermediate storage hopper after which it runs to the reading head so as to arrive finally at the playback reel not to mention the guide mechanisms for the tape according the variable paths.

The result of this is that the known apparatus is in the form of a wall cabinet.

U.S. Pat. No. 28.461 describes an apparatus for playing back a cassette in which from each side of the reading head the tape is run in a suction well. A special means is provided to bring a loop of tape from the cassette to the entry of each well. The object of these wells is to regulate the tension of the tape. The two reels rotate whenever the apparatus is used.

In addition apparatuses are known in accordance with U.S. Pat. No. 4,388,659 and WO-A-90/00800 which have substantially the same object as the EDN document but which appear to be not only cumbersome but also highly complex with storage which at least in part is ordered in relation to the tape between the recording head and the reading head.

Patent specification WO-A-90/00800 claims to provide the general public with the means of recording on and playing back a tape with the two processes being independent of each other. This document, however, recommends that the tape be left permanently in the apparatus something which is contrary to the requirements of the general body of users who like to have a recordings library.

According to patent specification JP-A-4 104 678 a cassette apparatus is also known with which simultaneous offset playback can be carried out and which is provided with a recording head, a reading head and a structure for storing a recorded part of the tape between the heads. This apparatus, however, does not have the means for carrying out an unwinding of the recorded tape in reverse from the playback reel towards the storage hopper. The user does not have the facilities provided by conventional tape recorders and videotape recorders. He is also unable to carry out a fast or slow search in reverse either with or without playback whilst continuing the recording.

On all the known apparatuses with which simultaneous offset playback can be carried out the installation of the tape is either not specified or made very complex by the use of intermediate storage. The fact that in the W0-A-90/00800 specification it is recommended not to change the tape is an indication of the prominence of this feature.

The object of this invention is therefore to create an apparatus which makes simultaneous offset playback possible and which is arranged in such a way that it is entirely compatible with the requirements of the general public as far as cost, space required and method of use are concerned.

According to the invention the apparatus which makes possible the recording and simultaneous or simultaneous offset playback of a recording tape such as a tape of a video-tape recorder or a tape recorders, comprising a recording head, means for making the tape circulate in front of the recording head towards and from a recording reel respectively, a reading head, means to make the tape circulate in front of the reading head towards and from a playback reel respectively, both the heads being provided with means making it possible to actuate them independently of each other, and in addition a storage hopper located operatively between the two heads so as to receive a part of the tape and to store it when the tape region facing the reading head is at a distance from the tape region facing the recording head, and the said apparatus including fitting means for a cassette with two reels each of which is associated with one of the ends of the tape so that the recording and reading heads are arranged so that each one cooperates with one of the reels of the cassette with one of them constituting in operation the recording reel and the other the playback reel respectively, is characterized in that the apparatus also includes means for bringing the tape into position in relation to the storage hopper after the insertion of the cassette with the storage hopper storing the said tape in loose and random folds and in that the apparatus includes means for feeding the tape in a reverse movement in relation to the direction of recording from the playback reel towards the storage hopper.

The invention combines the "ordered" arrangement represented by the cassettes with two reels with the "disorder" represented by storage in loose and random folds of a part of the tape which may be relatively long.

By means of grouping the two reels together in a cassette which may be a cassette of a format which is currently commercially available for a conventional apparatus, the use of the apparatus is considerably simplified including its loading and unloading. The user does not even have to be concerned with the presence of the intermediate hopper, because the means for bringing the tape into position in relation to the hopper carry out the necessary positioning.

This invention makes it possible and in particular for ordinary domestic users to have the facility of what is called here "simultaneous offset playback" which consists of being able, when a recording is in progress, of playing back the same tape at any point whatever between its beginning and the recording point. It is possible to have the tape opposite the reading head move backwards without interrupting the recording process.

The user is also able to effect a rapid playback of the recorded portion so as, where applicable, to make up the time by rapidly passing over the sections in which he is not interested so as to finish up by following the programme live.

The apparatus according to the invention can also be used as a normal apparatus and is provided for this purpose with a rapid advance and return movement. It can be used for playing back alone or recording alone and in the case of a video-tape recorder with a freeze-frame.

It has been found possible to set down a tape in loose folds in a random manner in a rectangular case if this tape is prevented from resting on the side. For this purpose a hopper is used which has the same width as the tape and means are used to prevent it from lying on the side. This is preferably achieved by disposing the hopper in a vertical position so as to make use of the force of gravity but it can also be achieved by blowing or suction or any other similar means. It has been found in practice that in this way it is possible to have the recording reel fed into the hopper without extracting it by means of the other reel; the tape is laid in superimposed or juxtaposed folds in a random manner and without forming knots. It is then possible whilst allowing the feeding of the recording coil to take place to operate the playback reel which still extracts the tape without forming knots. The playback tape can even be operated in reverse in such a way that the two reels simultaneously feed the hopper; during take up the tape portions are slid against each other and the folds are unravelled without getting entangled.

The apparatus is preferably characterized in that it also includes rolls with which it is possible to move the tape of the playback reel towards the storage hopper at different speeds in reverse with or without playback of the said tape.

The apparatus according to the invention is also distinctive in that:

the storage hopper is provided with an entry which is disposed between the said reading and recording head carriers, the storage hopper has in the direction of the width of the tape a dimension which is equal to the width of the tape, means are provided for detecting the exhausting of the reserve of tape in the hopper and independently or jointly means for drawing the tape in a loop towards the inside of the hopper from the situation in which a cassette has just been inserted in the apparatus, a tape tension detector is disposed between the two reels, when the tape is stored in the hopper the detector is used to indicate that the said storage hopper is empty when it is in contact with the tape, the detector is composed of an idle roll which is displaced vertically on a carriage so as to draw the tape in the operating position towards the inside of the storage hopper from the situation in which the cassette has just been inserted, the guiding and drive mechanisms of the tape are made up of five rolls for each of the two reels so that there are three idle rolls and two drive rolls for the playback reel and three idle rolls and two drive rolls for the recording reels, when the tape is stored in the hopper the detector is used to indicate that the said storage hopper is empty when it is in contact with the tape, the detector is composed of an idle roll which is displaced vertically on a carriage so as to draw the tape in the operating position towards the inside of the storage hopper from the situation in which the cassette has just been inserted, the guiding and drive mechanisms of the tape are made up of five rolls for each of the two reels so that there are three idle rolls and two drive rolls for the playback reel and three idle rolls and two drive rolls for the recording reel, the idle rolls are either mounted on bars actuated by pivots or on carriages which are displaced in slides according to the length of displacement required to make them active, the drive rolls of the playback reel do not rotate in the same direction whereas the drive rolls of the recording reel rotate in the same direction, the hopper can include a relatively narrow entry/outlet opening associated with means to guide a tape loop towards the inside of the hopper in such a way that the tape enters and leaves the hopper produced as a dead end between the recording head and the reading head.

The invention will be better understood on the basis of the following description with reference to the figures which show, by way of a non-restrictive example, an apparatus designed for a video tape for a video-tape recorder as follows.

Figure 1:
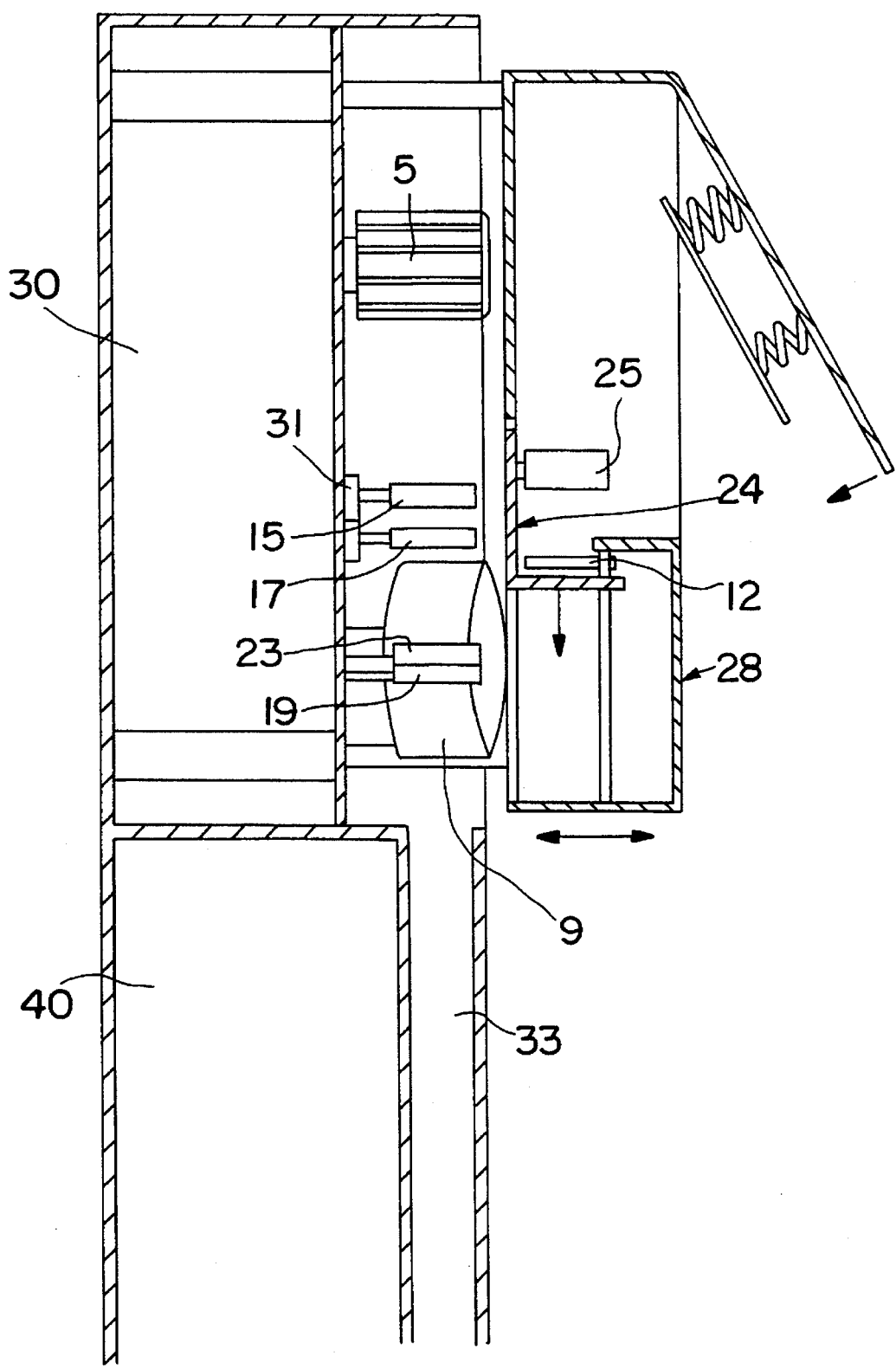
FIG. 1 shows a sectional side view of a video-tape recorder according to the invention.

As is shown in FIG. 1, the video-tape recorder includes apart from compartments 30 and 40 designed to contain the means of mechanical and electronic control, a cassette carrier magazine 28 and a storage hopper 33.

In this example the storage hopper 33 is disposed vertically in such a way that the tape is laid down in loose folds by gravity. The invention, however, is not restricted to this special embodiment and instead of using gravitational force another force as for example a blowing or suction force can be used.

Figure 2:
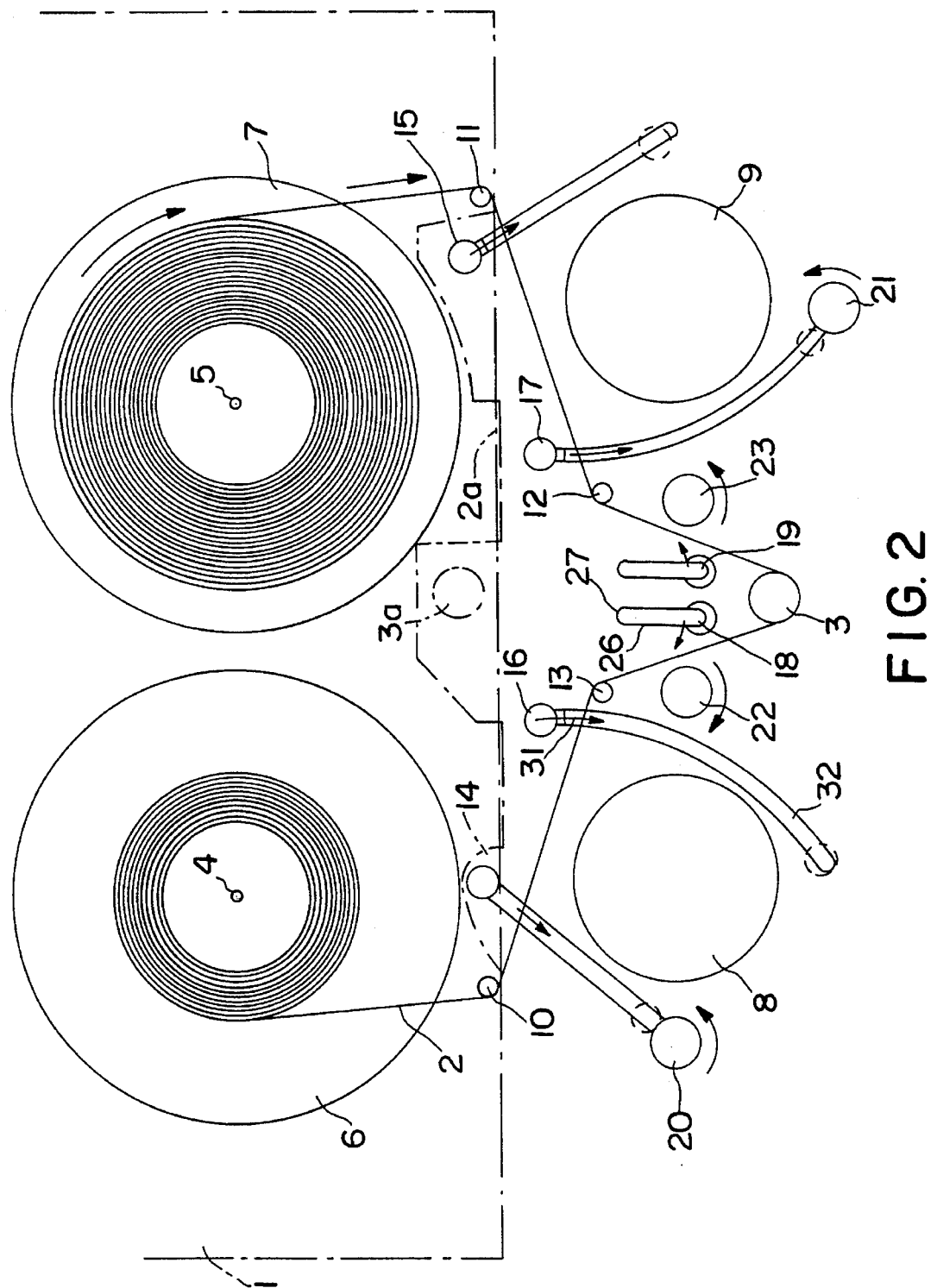
FIG. 2 shows the drive mechanism of the video tape of the video-tape recorder of FIG. 1.

As shown in FIG. 2 the drive mechanism of the video-tape recorder includes two drive pins 4 and 5 of the playback reel 6 and the recording reel 7 respectively, two video head carriers, a reading head carrier 8 and a recording head carrier 9, passive idle rolls 10, 11, 12 and 13, active idle rolls 14, 15, 16, 17, 18, and 19 mounted either on a rod 26 actuated by a pivot 27 for rolls 18 and 19 or on carriages 31 which are displaced in the slides 32 for rolls 14, 15, 16, and 17 and drive rolls 20, 21, 22 and 23.

Figure 3:
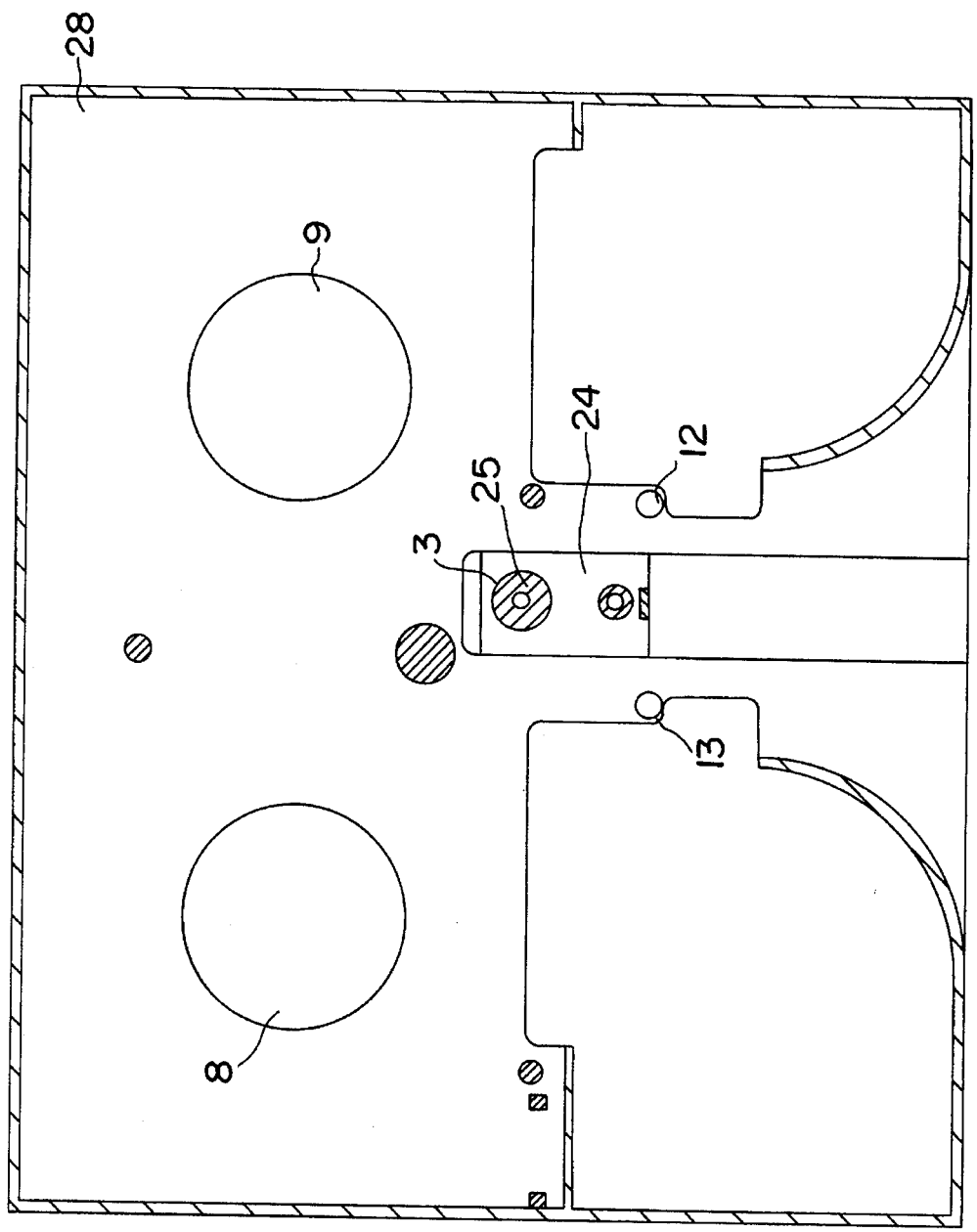
FIG. 3 shows a front view of the cassette carrier magazine.

As can be more easily seen in FIG. 3, the storage hopper 33 has a relatively narrow upper entry disposed between the said reading head carrier 8 and the said recording head carrier 9.

In the case of a video-tape recorder the recording and reading heads are themselves mobile in such a way that the tape is applied against them over approximately 180° and they are then carried by mobile supports which will be known hereinafter as "head carriers".

The cassette I including, in a manner known in itself, the playback and recording reels carrying the tape 2 is introduced manually into the cassette carrier magazine 28 and is fixed by means of the drive pins of the reels 4 and 5 and the passive idle rolls 10 and 11. The tape protector of cassette 1 opens and the tape 2 comes to be positioned at 2a between the detector 3, occupying at that-time-position 3a (FIG. 2) and the passive rolls 12 and 13.

Figure 4:
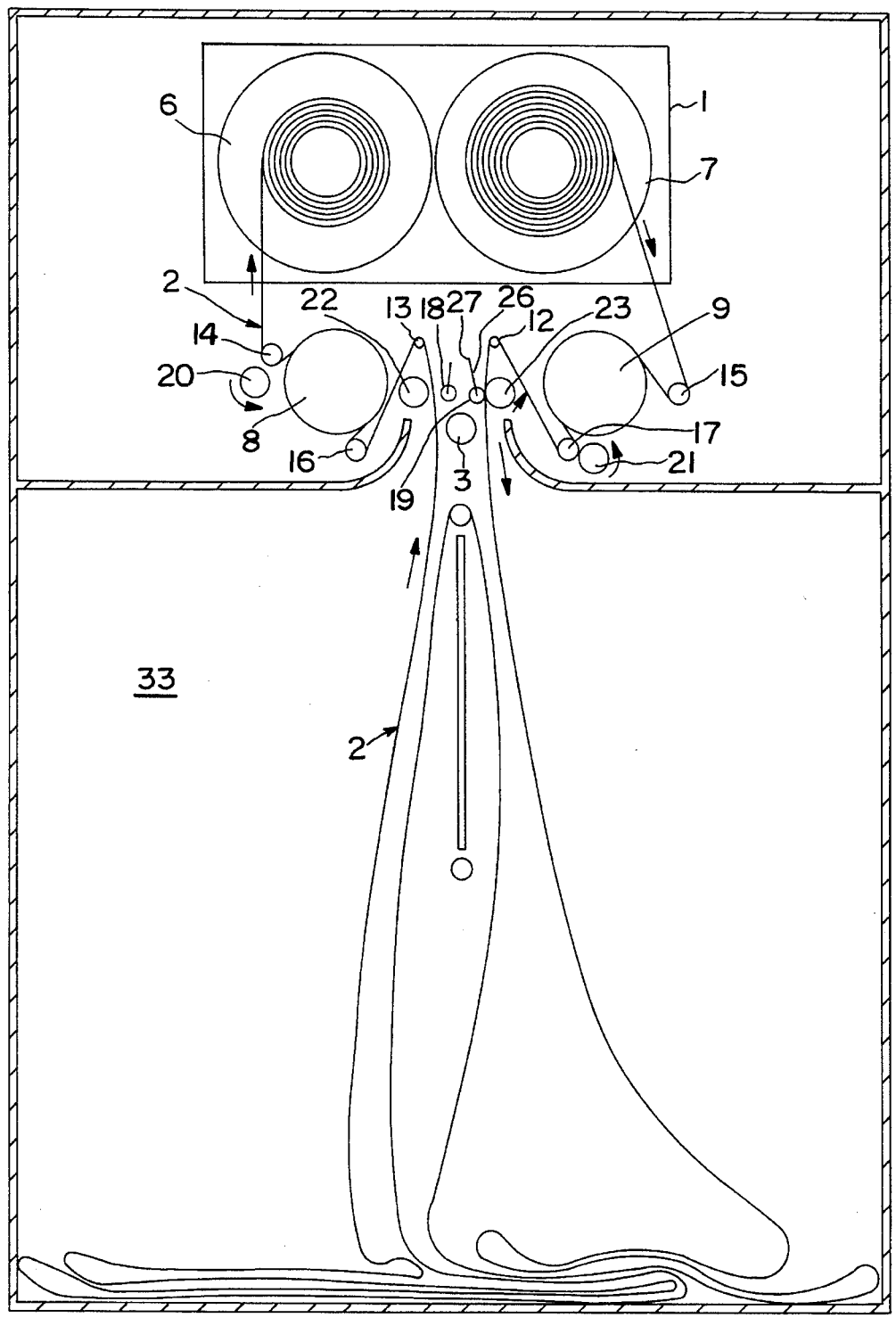
FIG. 4 shows a front sectional view of the apparatus showing the storage hopper of the video tape.

As can be seen from FIG. 3, the detector 3 is composed of an idle roll 25 mounted vertically on a mobile carriage 24, thus transversally to the path 1a of the tape. After the insertion of the cassette the carriage 24 is displaced automatically so that the roll 25 draws the tape 2 towards the operating position represented by a full line in FIG. 2 as well as in FIG. 3. The tape is then held between the passive rolls 12 and 13 and the detector 3, which makes the tape describe a pre-engagement loop in the entry and exit orifice of the storage hopper (33). The hopper 33 is produced as a dead end. It becomes considerably wider under heads 8 and 9 (FIG. 4) whilst having everywhere a thickness corresponding to the width of the tape.

The function of the detector 3 is also to prevent the tape from breaking when the tape is taut and the playback reel is driven at a speed which is greater than that of the feeding out of the recording reel. It is preferable to use this detector but it is not essential. If the hopper 33 is transparent the user can see the storage hopper being emptied and the tape becoming taut between the rolls.

When recording in the conventional manner the playback reel 6 is active in being wound up and the recording reel 7 is active in being fed out whilst the tape 2 is brought into contact with the drive roll 21 and the recording head carrier 9. This is obtained by actuating idle rolls 15, 17 by displacing their respective carriages; on the other hand the reading head carrier 8, the drive rolls 20, 22 and 23 and the idle rolls 14, 16, 18 and 19 are in the rest position.

During playback, i.e. when it is desired to display a previously recorded cassette, the playback reel 6 is active in being fed out and the recording reel 7 is active in being wound up whilst the tape 2 is brought into contact with the reading head carrier 8 and the drive roll 20 by the idle rolls 14 and 16. On the other hand the recording head carrier 9, the idle rolls 15, 17, 18 and 19 and the drive rolls 21, 22 and 23 are in the rest position.

During this playback alone, the user can carry out a rapid forward movement and the tape will still be in contact with the drive roll 20 and the reading head carrier 8. He can also carry out a fast back reading during which the tape 2 will be in contact with the reading head carrier 8 and the drive roll 22. In both cases the playback reel 6 and the recording reel 7 will have variable winding up and feeding out speeds.

During this conventional method of operating the videotape recorder rapid forward movements and rapid return movements can also be carried out without playback or recording with the reading head carrier 8 and the recording head carrier 9 being in the rest position.

During all these conventional applications of the video-tape recorder the drive speeds of the playback and recording reels are dependent on each other, the hopper 33 continues to remain empty and the detector 3 is in permanent contact with the tape 2.

According to the invention the video-tape recorder can also be controlled in simultaneous offset playback. When this is done as recording is still in progress by the head carrier 9 by means of the drive roll 21 and the passive rolls 15 and 17, the playback reel 6 is put into the rest position and the drive roll 23 is made active by means of the idle roll 19.

The roll 23 then draws the tape towards the storage hopper 33. Consequently as the recording is effected during which the tape 2 is in the normal manner brought into contact with the drive rolls 21 and 23 and the recording head 9 by means of the active idle rolls 15, 17 and 19 the tape is not drawn towards the playback reel and falls into the storage hopper 33.

During this storage of the tape the detector 3 is no longer in contact with the said tape.

The simultaneous offset playback is put into operation by actuating the playback reel 6 and by taking up the tape 2 again, stored in the hopper 33 and brought into contact with the drive roll 20 and the reading head carrier 8 by means of the idle rolls 14 and 16.

The user can carry out a part of this simultaneous offset playback in an accelerated manner so as to make up the time and to follow the end of the programme live without having to interrupt the recording. When this is done the tape 2 continues to be in contact with the reading head 8 and the drive roll 20 which is then actuated rapidly by means of the drive pin 4 of the playback reel 6 which has a variable windup mode according to a known process.

When the detector 3 is again in contact with the tape 2 which indicates that the hopper 33 is empty it stops the rapid playback so that the tape 2 is not broken but permits a playback at normal speed.

Whilst still in this simultaneous offset playback mode the user can carry out a reverse playback or a fast reverse playback. The tape 2 is then brought into contact with the drive roll 22 which can be actuated at rapid or normal speed and the reading head carrier 8 by means of idle rolls 16 and 18.

Finally still in simultaneous offset playback the user can carry out a fast or normal speed forward movement and a fast or normal speed return movement without playback. The tape is then no longer in contact with the reading head carrier 8 but is driven by the drive roll 22 by means of the idle roll 18 in the case of a return movement and wound up by reel 6 by means of the drive pin 4 in the case of a forward movement.

In the example described in this way a detector 3 has been provided the function of which is to detect the tension of the tape so as to avoid a break. It is not necessary however to fit a detector of this type and it is possible to fit a dynamometric device calibrated in relation to the resistance to traction of the tape on the roll 20 and the pin 4.

Above all however it is possible to position revolution counters on the drive rolls so as to know the length of the tape in storage so that it is not only possible to avoid putting the tape in tension but also to know the extent of the offset between recording and playback.

In practice it is preferable not to fill the storage hopper 33 when the apparatus is functioning durably solely in recording mode. Under these conditions a storage hopper of smaller size corresponding to approximately 1 hour of recording will be found to be sufficient. An example of use can therefore be as follows:

recording only from the beginning of a programme: the tape unwound by the recording reel is taken up by the playback reel without filling the hopper;

before the end of the programme the user wants to playback the beginning of the programme without interrupting the recording: he stops the playback reel and then puts it into fast reverse movement so as to send the recorded tape into the hopper 33 and re-reverses the direction of rotation of the playback reel so as to begin playback at normal speed or not with the possibility of reverse movement. The tape goes from the recording head into the hopper:

the user is interrupted by a telephone call: he operates a playback pause and the playback reel stops. The tape continues to go into the hopper from the recording head;

the user wants to make up the time: he plays back the tape in accelerated mode until the hopper 33 is empty and then he follows the programme live;

on the other hand the user wants to stop playback completely whilst continuing to record: he operates a "playback stop" control which automatically causes the deactivation of the playback head and the accelerated rotation of the playback reel in the winding up direction until the tape is exhausted in the hopper 33 after which the recording continues in the "normal" manner.

We claim:

1. Apparatus for recording and playback, of a recording tape such as a video-tape recorder or tape recorder tape, With which playback can be selectively carried out in three modes which are an immediate playback mode, a simultaneous offset playback mode in which the apparatus simultaneously records on a first region of the tape and reads a second region of the tape, which is at a distance from the first region, and a playback alone mode, the apparatus comprising a recording head (9), means for having the tape (2) circulate in front of the recording head and from a recording reel (6) respectively, a reading head (8), means for having the tape circulate in front of the reading head towards and from a playback reel (7) respectively, both the heads being provided with means enabling them to be actuated independently of each other, a storage hopper (33), located operatively between the two heads (8 and 9) for receiving and storing in loose and random folds a tape portion corresponding to the distance between said first and second regions of the tape, means for selectively actuating the reading head and selectively feeding the tape in forward and reverse in front of the reading head independently of actuation of the recording head, whereby during recording of the first region of the tape by the recording head the second region of the tape can be selectively read by the reading head and fed without being read, selectively with and without change of the distance between the first and second regions of the tape, fitting means (28) for a cassette (1) with two reels (6 and 7) each of which is associated with one of the ends of the tape, the recording and reading heads being arranged so that each one cooperates with one of the cassette reels, one of which in operation constitutes the recording reel and the other the playback reel respectively, and means (3, 24 and 25) for bringing the tape into position in relation to the storage hopper (33) after insertion of the cassette into operational relationship with the fitting means.

2. Apparatus according to claim 1, characterized in that it also includes rolls (18 and 22) with which the tape of the playback reel (7) can be moved in reverse at different speeds towards the storage hopper (33) with or without playback of the said tape.

3. Apparatus according to claim 1, characterized in that the storage hopper (33) is in a vertical position and has an upper entry disposed between the said reading head (8) and the said recording head (9).

4. Apparatus according to claim 1, characterized in that the storage hopper (33) has, in the direction of the width of the tape (2), a dimension equal to the width of the tape.

5. Apparatus according to claim 1, characterized by means (3 and 24 and 25) for detecting the exhaustion of the length of tape contained in the hopper (33).

6. Apparatus according to claim 1, characterized in that the said means for bringing the tape into position include means (24 and 25) for drawing a portion of the tape (2) into a loop towards the inside of the hopper in such a way that the said portion of the tape enters and leaves the storage hopper by its entry.

7. Apparatus according to claim 6, characterized in that the means for drawing a portion of the tape include an idle roll (25) which can be displaced vertically on a carriage (24) so as to draw the tape (2) into the operating position towards the inside of the hopper from the initial position when the cassette is inserted.

8. Apparatus according to claim 7, characterized in that from a situation in which a reserve of the said tape (2) is stored in the hopper (33), the idle roll (25) is used to indicate that the said reserve has been used up when it is stressed by the tape towards the outside of the hopper.

9. Apparatus according to claim 1, characterized in that it includes revolution counters on the guide and drive mechanisms so as to know the size of the offset between recording and playback.

10. Apparatus according to claim 1, characterized in that the hopper is associated with means for carrying out a blowing or suction action on the random folds formed by the tape.

11. Apparatus according to claim 1, characterized in that the storage hopper (33) has, for the tape, a relatively narrow entry/outlet opening located between the two heads (8 and 9) and associated with means (3 and 24 and 25) for pre-engaging a loop of tape towards the inside of the storage hopper (33).

* * * * *